(12) United States Patent
Stürmer et al.

(10) Patent No.: US 6,502,683 B2
(45) Date of Patent: Jan. 7, 2003

(54) DRIVER DISK FOR A CLUTCH PLATE

(75) Inventors: Winfried Stürmer, Euerbach (DE); Norbert Lohaus, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/732,593

(22) Filed: Dec. 8, 2000

(65) Prior Publication Data

US 2001/0006141 A1 Jul. 5, 2001

(30) Foreign Application Priority Data

Dec. 10, 1999 (DE) .......................................... 199 59 586

(51) Int. Cl.[7] ................................................ F16D 13/64
(52) U.S. Cl. .................................. 192/107 C; 192/52.6
(58) Field of Search ............................... 192/52.3, 52.6, 192/107 C, 200

(56) References Cited

U.S. PATENT DOCUMENTS

| 2,085,167 A | * | 6/1937 | Nutt ....................... 192/107 C |
| 2,101,410 A | * | 12/1937 | Nutt et al. ............... 192/107 C |
| 2,107,741 A | * | 2/1938 | Reed ....................... 192/107 C |
| 2,307,006 A | * | 12/1942 | Wemp ...................... 192/107 C |
| 5,419,422 A | * | 5/1995 | Schraut ................... 192/107 R |

FOREIGN PATENT DOCUMENTS

| DE | 41 09 602 A1 | * | 9/1992 |
| DE | 43 00 665 A1 | * | 9/1993 |
| GB | 2 165 323 A  | * | 4/1986 |

* cited by examiner

Primary Examiner—Rodney H. Bonck
(74) Attorney, Agent, or Firm—Cohen, Pontani, Lieberman & Pavane

(57) ABSTRACT

A driver disk for a clutch plate includes a facing carrier for holding friction facings. The facing carrier is designed in one piece with facing springs for axial suspension of the friction facings. The facing springs are constructed as pot-shaped protuberances and have a flat area provided for contacting the friction facings. Since the facing springs are made as one piece with the facing carrier, the driver disk has only a small number of structural component parts and can be produced very economically.

15 Claims, 3 Drawing Sheets

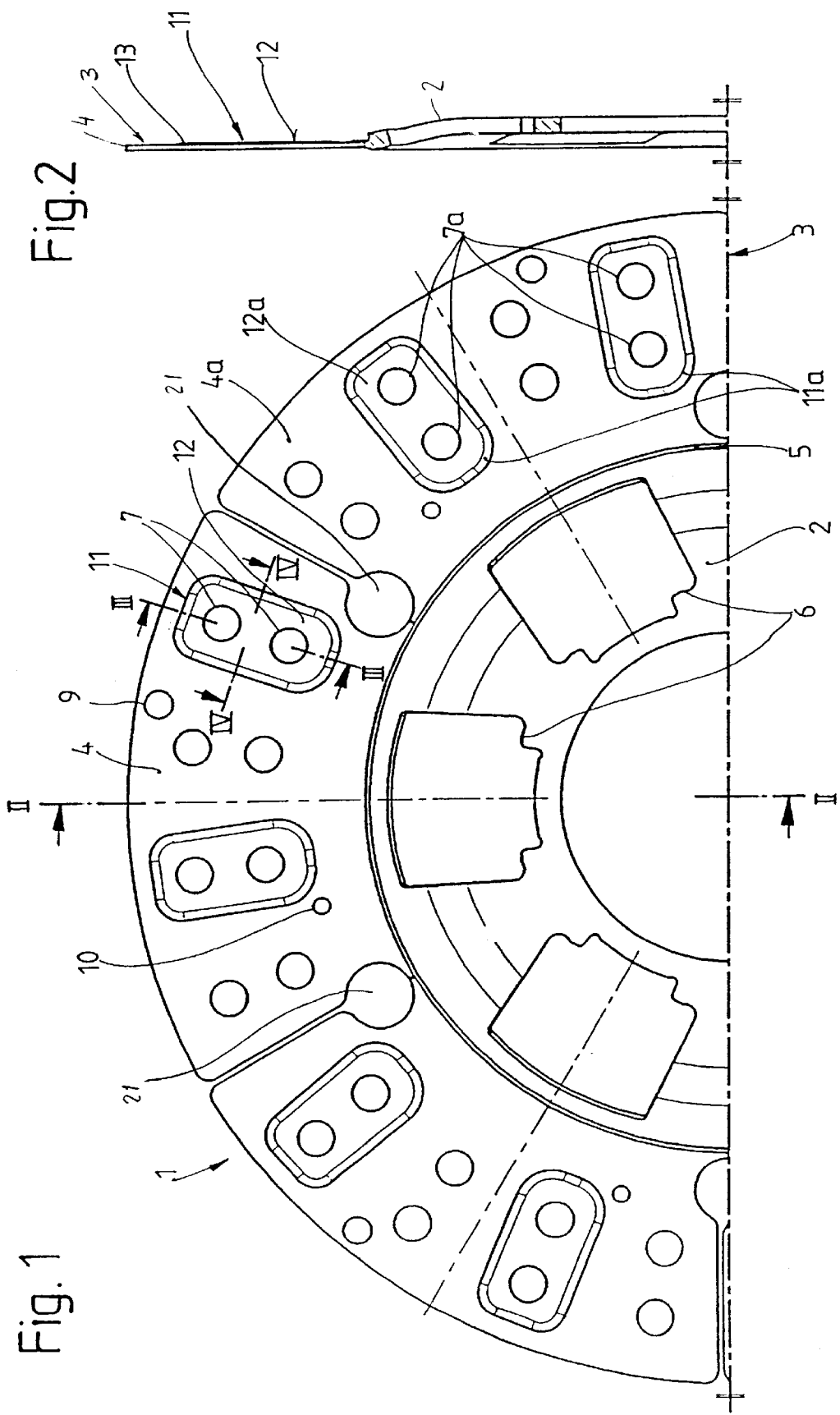

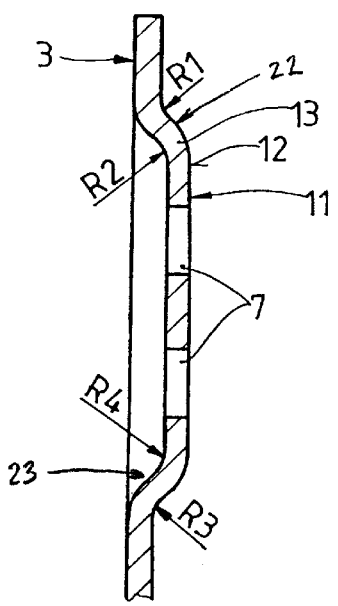
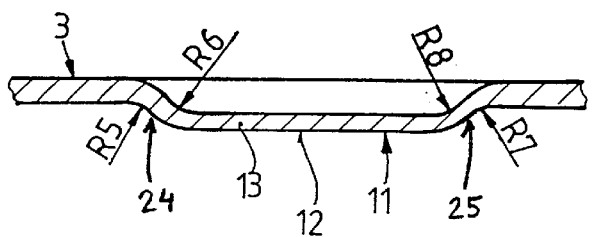
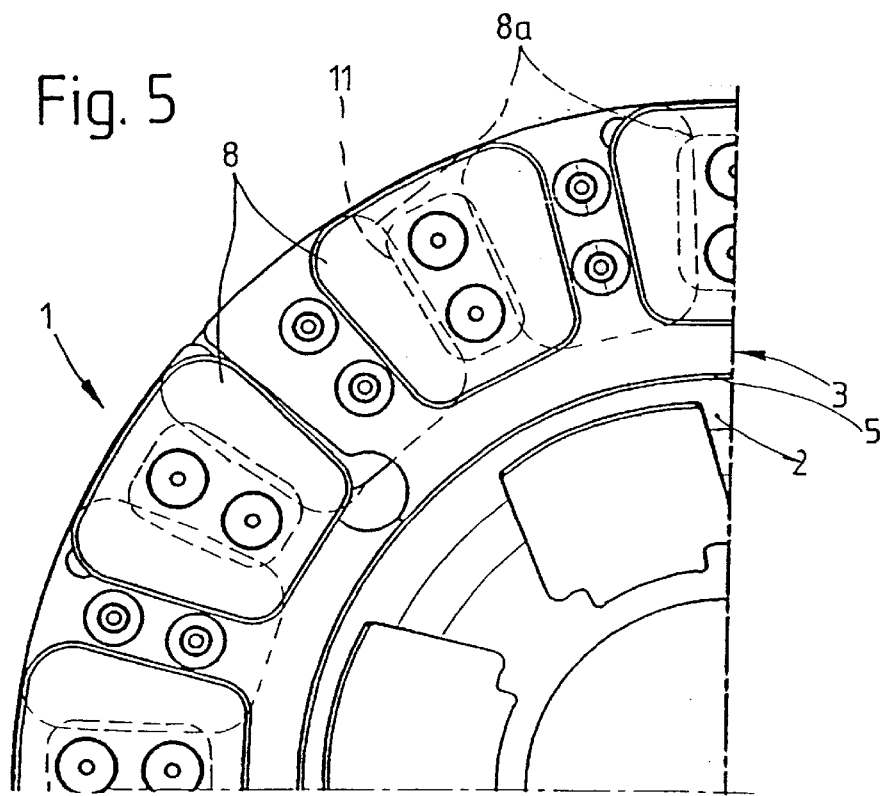

DRIVER DISK FOR A CLUTCH PLATE

BACKGROUND OF THE INVENTION

1. Field of the Invention

The present invention is directed to a driver disk for a clutch plate of a motor vehicle clutch with a strengthening or reinforcement part and a facing carrier connected to the reinforcement part and arranged for holding friction facings, the facing carrier having facing springs for axial suspension of the friction facings on the facing carrier.

2. Description of the Related Art

Driver disks having a reinforcement part and a facing carrier with facing springs are known in practice. The reinforcement part of these known driver disks has a radial outer edge which supports the facing carrier which is shaped like a disk ring and includes a plurality of individual segments. The facing carrier is produced from sheet metal which is substantially thinner than that of the reinforcement part. High stability is achieved in this driver disk by welding or soldering the reinforcement part to the facing carrier. Further, the quantity of structural component parts of the driver disk may be reduced in this way. This makes production of the driver disk very economical for series manufacture, particularly in comparison to a riveted driver disk.

A problem with the known driver disks is that it is very time-consuming to mount facing springs on the facing carrier in the area provided for the friction facings.

SUMMARY OF THE INVENTION

An object of the present invention is to design a driver disk having a reinforcement part and a facing carrier connected to the reinforcement part with facing springs arranged for holding friction facings in such a way that the driver disk is economical to produce.

According to the present invention, the problem is solved in that the facing carrier and the facing springs are constructed in one piece.

The facing springs according to the present invention are manufactured together with the facing carrier. Accordingly, manufacture of the inventive driver disk requires only a small number of work operations. Moreover, since the facing springs are constructed integral with the facing carrier, assembly of the present invention does not require an independent work step for mounting of the facing springs. The assembly of the inventive driver disk requires a particularly small number of structural component parts and work operations and the driver disk may therefore be economically produced.

According to an embodiment of the present invention, the facing springs have particularly high spring stiffness. Resilient areas of the facing springs are arranged opposite one another in the facing carrier and include an area in the facing spring for contacting the friction facings. In this way, an area of the facing springs which contacts the friction facings is supported at two oppositely located areas of the facing carrier. Due to the high spring stiffness of the facing springs which is generated by their shape, spring steel which is difficult to weld is not required to be used for the facing springs and therefore the facing carriers. The use of non-spring steel further reduces the manufacturing costs for the driver disk according to the present invention.

For example, the facing springs may include waves or corrugations of the facing carrier which extend from the radial inner side to the radial outer side. However, springiness or elasticity of the facing springs leads to tangential deformation of the facing carrier. These deformations of the facing carrier are preventable according to another embodiment of the present invention when the facing springs have a closed outer contour. A further advantage of using the closed outer contour on the facing spring is that the area of the facing springs contacting the friction facing is not displaced relative to the friction facing when springing. This arrangement prevents sliding of the facing springs over the friction facing and accordingly prevents strong hysteresis.

According to a further embodiment of the invention, the facing springs may be constructed in a particularly simple manner in that the facing carrier has pot-shaped raised portions or protuberances for axial suspension of the friction facings on the facing carrier.

Point loading of the friction facings by the facing springs is prevented by constructing flat projecting areas of the protuberances which are provided for contacting the friction facings.

According to a further embodiment, friction between the facing springs and the friction facings is further reduced by including cutouts in the facing carrier in the area of the facing springs for containing or absorbing deformations generated by axial movement of the friction facings. The recesses may be optionally arranged as openings or depressions in the facing carrier.

The friction facings may be arranged with large spring paths of friction facings located opposite one another when the facing carrier has protuberances arranged on both sides to form facing springs.

However, the driver disk according to the invention may be manufactured especially economically when all of the protuberances are arranged on one side of the facing carrier.

A clutch plate provided with the driver disk according to the present invention may be manufactured in a particularly economical manner when the facing springs are designed for directly supporting the facing material of the friction facings.

A desired spring characteristic of the facing springs may be generated, for example, by a material upsetting of the facing carrier or recesses. However, according to a further embodiment of the present invention, the facing springs have high spring stiffness when the protuberances forming the facing springs have radii at their deflecting areas. The magnitude of the radii and the distances between the radii determine the spring characteristic of the facing springs.

A multilevel or multistage spring characteristic of the driver disk according to the invention may be generated in a simple manner when the facing springs have elastic or resilient stops. This multistage spring characteristic improves comfort during engagement of the clutch outfitted with the driver disk according to the present invention.

A driver disk exhibiting multilevel or multistage spring characteristics may be produced with reduced manufacturing costs when the facing springs are produced with different spring forces and/or spring paths. Therefore, the driver disk may exhibit multistage spring characteristics without resilient stops. The different spring forces or spring paths may be adjusted, for example, by a corresponding arrangement of the radii of the deflecting areas of the protuberances and their spacing from one another. The spring forces and the spring paths may be varied in any desired manner when the driver disk has facing springs arranged on opposite sides of the facing carrier or when the driver disk has facing springs arranged on the same side of the facing carrier.

In a clutch including the driver disk according to the present invention, a high area pressure of the radial inner areas of the friction facings may be prevented in a simple manner during engagement of the clutch when the radii of the protuberances of the facing spring near the radial outer area of the facing carrier are smaller than the radii of the protuberances near the radial inner area of the facing carrier. This arrangement increases the dynamic torque transmitting capability of the clutch. As a result, fading is reduced particularly in case of high torque transmission of the clutch occurring such as, for example, when starting the motor vehicle.

A clutch including the driver disk according to the present invention has good separating behavior during disengagement when the flat area of the protuberances which is provided for contact with the friction facings is inclined relative to a section of the facing carrier that is perpendicular to the axis of rotation. According to this embodiment, the orientation of the friction facings in the disengaged state is not parallel to the counter-friction surface of the clutch. Therefore, the friction facings are prevented from adhering to the counter-friction surface through adhesion or vacuum.

To improve the separating behavior of the clutch including the driver disk according to the present invention in the disengaged state, the flat area of the protuberances which is provided for contact with the friction facings is inclined relative to the facing carrier in a tangential section. Due to this construction, the friction facings are inclined in rotational direction, so that an air cushion is formed between the friction facings and the counter-friction surfaces in the disengaged state. This reliably prevents the clutch disk outfitted with the driver disk according to the invention from rotating along.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a top view showing a partial area of a driver disk according to an embodiment of the present invention;

FIG. 2 is a sectional view of the driver disk from FIG. 1 along line II—II;

FIG. 3 is a greatly enlarged sectional view through a facing spring of the driver disk from FIG. 1 along line III—III;

FIG. 4 is a greatly enlarged sectional view through a facing spring of the driver disk from FIG. 1 along line IV—IV;

FIG. 5 is a top view of a partial area of the driver disk from FIG. 1 with friction facings arranged thereon.

DETAILED DESCRIPTION OF THE PRESENTLY PREFERRED EMBODIMENTS

Figure 4A:
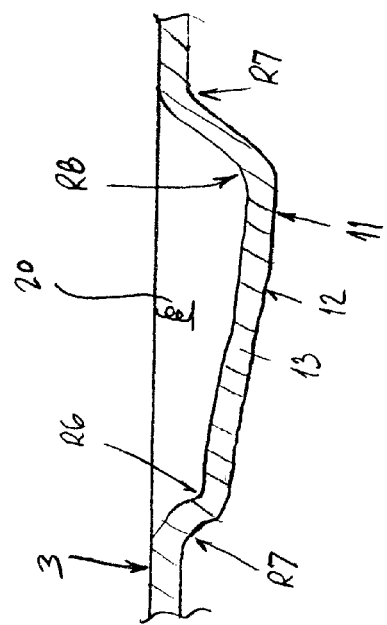
FIG. 4A is a greatly enlarged sectional view similar to that of FIG. 4 of an alternate embodiment of a facing spring according to the present invention.

FIG. 1 is a top view showing one half of a driver disk 1 according to an embodiment of the present invention. The driver disk 1 includes a reinforcement part 2 constructed as a hub part and a facing carrier 3 which is fastened to the reinforcement part 2. The facing carrier 3 comprises a plurality of segments 4, 4a which are welded to the reinforcement part 2. A weld seam 5 for fastening the segments 4, 4a by material engagement extends continuously along the entire circumference of the reinforcement part 2. Of course, the weld seam 5 may alternatively include a plurality of sections which are separate from one another along the circumference. The reinforcement part 2 has a plurality of windows 6 for receiving torsion springs, not shown, of a torsional vibration damper. The driver disk 1 is connectable with a hub, likewise not shown, via the torsional vibration damper. The segments 4, 4a have a plurality of bore holes 7, 7a for holding friction facings 8, 8a (see FIG. 5) as well as mounting bore holes 9, 10 which are distributed in an asymmetrical manner for facilitating automated assembly. Some of the bore holes 7 are arranged on facing springs 11, 11a which are integrally formed with the facing carrier 3. In the embodiment shown, one half of the bore holes 7 are arranged on facing springs 11, 11a. The facing springs 11, 11a have a closed outer contour allowing areas 12, 12a of the facing springs 11, 11a adjoining the bore holes 7 to move perpendicular to the drawing plane. The friction facings 8, 8a shown in FIG. 5 are connected to the segments 4, 4a in the area of the bore holes 7, 7a such as, for example, by riveting. The mounting bore holes 9, 10 enable a simple alignment of the segments 4, 4a for facilitating automated assembly of the driver disk 1. The facing carrier 3 further comprises cutouts proximate the facing springs 11, 11a for containing or absorbing deformations generated by axial movement of the friction facings 8, 8a. The cutouts 21 may be optionally arranged as openings or depressions in the facing carrier 3.

Figure 2A:
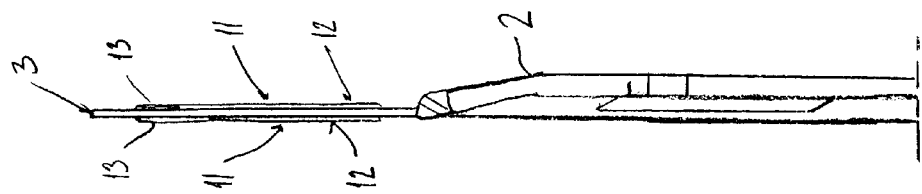
FIG. 2A is a sectional view of a driver disk similar according to a further embodiment of the present invention

FIG. 2 is a sectional view along line II—II through the driver disk 1 of FIG. 1 which shows that the segments 4, 4a of the facing carrier 3 are produced from a thinner sheet metal than the reinforcement part 2. Further, the facing springs 11 are constructed as protuberances 13 which face in the same direction.

Figure 3A:
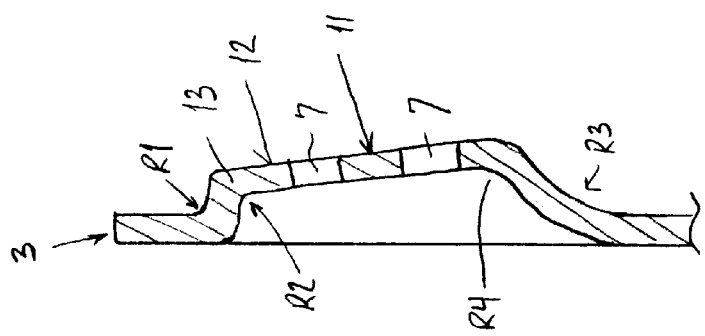
FIG. 3A is an enlarged view similar to that of FIG. 3 of an alternate embodiment of a facing spring according to the present invention.

FIG. 3 is a greatly enlarged sectional view through one of the facing springs 11 from FIG. 1 along line III—III which shows that the protuberance 13 is formed in a cup-shaped manner by a plastic deformation of the facing carrier 3. The protuberance 13 includes a deflecting area 22 having corresponding radii R1–R2 and a deflecting area 23 having corresponding radii R3–R4. The area 12 of the facing spring 11 adjoining bore hole 7 is flat for contact with friction facings 8 shown in FIG. 5. FIG. 4 is a greatly enlarged sectional view of the facing spring 11 from FIG. 3 in a sectional view along line IV—IV from FIG. 1. This Figure shows that the area 12 for contacting the friction facings 8 is connected with the rest of the area of the facing carrier 3 in tangential or circumferential direction via a deflective area 24 having corresponding radii R5–R6 and a deflecting area 25 having corresponding radii R7–R8. With force acting on the facing springs 11, the deflecting areas 22–25 of the facing springs 11 formed by radii R1–R8 deform elastically and allow an axial movement of the friction facings 8 shown in FIG. 5. The spring path and the spring characteristic are adjustable by changing the size of the radii R1–R8 and by changing their distance from one another. Further, the area 12 provided for contacting the friction facings 8 shown in FIG. 5 may be arranged at an inclination to the rest of the area of the facing carrier 3 by a corresponding arrangement of the radii R1–R8 and their distance from one another. Inclined arrangement of the area 12 is shown in FIG. 3A and FIG. 4A in exaggerated form for illustration. In FIG. 3A the area 12 is inclined relative to a section of the facing carrier 3 that is perpendicular to the axis of rotation. In FIG. 4A the area 12 is inclined relative to a tangential direction.

FIG. 4A also schematically depicts an elastic or resilient stop 20. The use of the stop allows the facing spring 11 to have a multilevel or multistage spring characteristic. This multistage spring characteristic improves comfort during engagement of the clutch outfitted with the driver disk 1 according to the present invention.

FIG. 5 shows a partial area of the driver disk 1 from FIG. 1 with the friction facings 8, 8a fastened thereto. It will be seen that all of the friction facings 8 arranged on one side of the driver disk 1 are arranged on the facing springs 11, 11a, while the friction facings 8a arranged on the opposite side of the driver disk 1 are fastened directly to the facing carrier 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A driver disk for a clutch plate of a motor vehicle clutch, comprising:
    a reinforcement part having a radial outer circumference; and
    a facing carrier arranged for holding friction facings and connected to said radial outer circumference of said reinforcement part via one of welding and soldering, said facing carrier further comprising facing springs for axial suspension of the friction facings, wherein said facing springs are constructed as one integral piece with said facing carrier.

2. The driver disk of claim 1, wherein said facing springs comprise resilient deflecting areas arranged on said facing carrier on mutually opposing sides of said facing springs and a projecting area contactable with the friction facings.

3. The driver disk of claim 2, wherein said facing springs comprise a closed outer contour.

4. The driver disk of claim 1, wherein said facing carrier comprises pot-shaped protuberances for axial suspension of the friction facings.

5. The driver disk of claim 4, wherein said protuberances comprise flat projecting areas arranged for contacting said friction facings.

6. The driver disk of claim 5, wherein said flat projecting areas of said protuberances are inclined relative to a section of said facing carrier that is perpendicular to said axis of rotation.

7. The driver disk of claim 5, wherein said flat projecting areas of said protuberances are inclined relative to a tangential direction.

8. The driver disk of claim 4, wherein said protuberances are arranged on both axial sides of said facing carrier to form facing springs.

9. The driver disk of claim 4, wherein each of said protuberances is arranged on one axial side of said facing carrier.

10. The driver disk of claim 4, wherein said protuberances forming the facing springs have deflecting areas for forming said protuberances, wherein said deflecting areas include radii for forming said deflecting areas.

11. The driver disk of claim 10, wherein radial outer radii of said protuberances are smaller than radial inner radii of said protuberances.

12. The driver disk of claim 1, wherein said facing carrier further comprises cutouts proximate said facing springs for absorbing deformations generated by axial movement of said friction facings.

13. The driver disk of claim 1, wherein said facing springs are arranged for directly supporting the friction facings.

14. The driver disk of claim 1, wherein said facing springs further comprise resilient stops.

15. The driver disk of claim 1, wherein one of said facing springs comprises one of a different spring force and a different spring path than another of said facing springs.

* * * * *